(12) United States Patent
Lee

(10) Patent No.: US 11,671,633 B2
(45) Date of Patent: Jun. 6, 2023

(54) SYSTEM FOR PROVIDING LIVE COMMERCE SERVICE

(71) Applicant: LALASTATIONS Co., LTD, Seoul (KR)

(72) Inventor: Chui Ho Lee, Seoul (KR)

(73) Assignee: LALASTATIONS Co., LTD, Seoul (KR)

( * ) Notice: Subject to any disclaimer, the term of this patent is extended or adjusted under 35 U.S.C. 154(b) by 0 days.

(21) Appl. No.: 17/876,048

(22) Filed: Jul. 28, 2022

(65) Prior Publication Data

US 2023/0140668 A1 May 4, 2023

(30) Foreign Application Priority Data

Oct. 28, 2021 (KR) .................. 10-2021-0146084

(51) Int. Cl.
*H04N 21/2187* (2011.01)
*H04N 21/254* (2011.01)
*H04N 21/478* (2011.01)
*H04N 21/442* (2011.01)
*H04N 21/258* (2011.01)

(52) U.S. Cl.
CPC ..... *H04N 21/2187* (2013.01); *H04N 21/2542* (2013.01); *H04N 21/25891* (2013.01); *H04N 21/44222* (2013.01); *H04N 21/47815* (2013.01)

(58) Field of Classification Search
CPC ............ H04N 21/812; H04N 21/2547; H04N 21/4316; H04N 21/2187; H04N 21/2542; H04N 21/25891; H04N 21/44222; H04N 21/47815
USPC ...................................................... 725/5, 37
See application file for complete search history.

(56) References Cited

U.S. PATENT DOCUMENTS

2009/0254931 A1* 10/2009 Pizzurro ............ H04N 21/2547 725/60
2015/0262208 A1* 9/2015 Bjontegard ........ G06Q 30/0205 705/7.31

FOREIGN PATENT DOCUMENTS

KR 10-2002-0069582 A 9/2002
KR 10-2011-0066064 A 6/2011

OTHER PUBLICATIONS

Written Decision on Registration of KR10-2021-0146084 dated Dec. 21, 2021.

* cited by examiner

*Primary Examiner* — Yassin Alata
(74) *Attorney, Agent, or Firm* — Sughrue Mion, PLLC

(57) ABSTRACT

Disclosed herein is a system for providing a live commerce integrated solution comprising a broadcast terminal configured to film a live broadcast for product sales, a viewer terminal configured to stream the live broadcast, and a manager server configured to provide a live broadcast platform to be accessed by the broadcast terminal and the viewer terminal.

2 Claims, 4 Drawing Sheets

SYSTEM FOR PROVIDING LIVE COMMERCE SERVICE

CROSS REFERENCE TO RELATED APPLICATION(S)

This application claims the benefit of Korean Patent Application No. 10-2021-0146084, filed Oct. 28, 2021, which is hereby incorporated by reference in its entirety into this application.

BACKGROUND OF THE INVENTION

1. Technical Field

The disclosure relates to a system for providing a live commerce service, and more particularly, to a system for matching a resource required for live commerce, such as a studio, a show host, a producer (PD), a content, broadcasting deliberations, etc.

The disclosure also relates to a system for providing an integrated solution for building up a collaboration business with micro business owners in each region through a live commerce matching service.

The disclosure also relates to a system for providing a new live commerce integrated solution through a quick commerce service that provides a limited initial supply of live commerce through quick delivery.

2. Description of the Related Art

With the development of communication technologies and associated media diversification and popularization, the idea of business activities related to, for example, product purchase has been changed and electronic commercial transaction (EC) is being invigorated.

In general, EC is a type of commercial transactions that allows a buyer to be able to do the shopping and make a purchase in a virtual space through a network such as the Internet without visiting offline shops.

The EC has been settled as a major commercial transaction form for ordinary people because the EC allows buyers to be free from sellers' business hours and save their time and cost for moving to the offline shops.

Furthermore, with the spread of smartphones these days, mobile EC, which is a service to buy a product with a mobile communication terminal or a personal portable information terminal, is being active.

Patent document 1 (KR patent publication No. 2002-0069582) discloses an auction method through broadcasting on the Internet with image materials made in advance to allow the buyer to make more reasonable purchases and the seller to secure a new market by using an Internet broadcasting technology to provide product information through video and participate in an online tender like an auction.

The traditional EC having an image delivery format uses a relatively less amount of data but is limited in terms of representing an information delivery message, and the existing television home shopping has a downside of having high barriers to micro businesses and personal sellers due to high commission and broadcast channel limitations.

SUMMARY OF THE INVENTION

The disclosure provides a system for matching a resource required for live commerce for micro and small businesses, such as a studio, a show host, a producer, a content, broadcasting deliberations, etc.

The disclosure also provides a system for providing an integrated solution for building up a collaboration business with micro business owners in each region through a live commerce matching service.

The disclosure also provides a system for providing a new live commerce integrated solution through a quick commerce service that provides a limited initial supply of live commerce through quick delivery.

The technological objectives of the disclosure are not limited thereto, and other objectives, which are not mentioned, may also be clearly appreciated by those of ordinary skill in the art through the following description.

According to an aspect of the disclosure, a system for providing a live commerce integrated solution comprising a broadcast terminal configured to film a live broadcast for product sales; a viewer terminal configured to stream the live broadcast; and a manager server configured to provide a live broadcast platform to be accessed by the broadcast terminal and the viewer terminal.

According to an exemplary embodiment, the manager server comprises a viewer analyzer configured to collect and analyze live broadcast viewer information; a resource matcher configured to generate live broadcast configuration information matched with live broadcast resources including a content for each product, a producer, a studio, a show host, and broadcast deliberations; and a commerce supporter configured to support an additional service for product sales through the live broadcast.

According to an exemplary embodiment, the viewer analyzer comprises a viewer data collector configured to request and receive a category of a product on sale in a current live broadcast from the broadcast terminal, request and receive information about a viewer watching the live broadcast from the viewer terminal, and build a viewer information database storing viewer information matched for each product category; a product based viewer data analyzer configured to use the viewer information database to estimate a target viewer type by combining respective elements of the viewer information based on a certain criterion for each product category and store the target viewer type matched for each product category; and a product based buyer data analyzer configured to request and receive information about a buyer who purchased the product among viewers watching the live broadcast from the viewer terminal, build a buyer information database storing buyer information matched for each product category, use the buyer information database to estimate a target buyer type by combining respective elements of the buyer information according to a certain criterion for each product category, and store the target buyer type matched for each product category.

According to an exemplary embodiment, the resource matcher comprises a target viewer type setting module configured to request and receive a category of a product to be aired on a live broadcast from the broadcast terminal or a seller terminal owned by a seller who sells the product, and set a target viewer type matched and stored with the received category of the product to a target viewer type of the product to be on sale; a target buyer type setting module configured to set a target buyer type matched and stored with the received category of the product to a target buyer type of the product to be on sale; and a live broadcast configuration information generator configured to include a live broadcast resource database storing a product category, a target viewer type and a target buyer type matched with respective elements of a live broadcast resource according to a certain criterion, search the live broadcast resource database for a category of a product to be on sale, a target viewer type of the product to be on sale, and a target buyer type of the product to be on sale to extract each element of the live broadcast resource, generate live broadcast configuration information by combining the extracted live broadcast resources according to a certain criterion, and transmit the live broadcast configuration information to the broadcast terminal or the seller terminal.

According to an exemplary embodiment, the commerce supporter comprises a quick commerce service provider configured to obtain payment information through a live broadcast, extract payment information for an initial limited supply of a product on sale as quick delivery targeted payment information, and transmit the quick delivery targeted payment information to the seller terminal; and a translation service provider configured to translate a language used in the live broadcast into a particular language according to a setting of the viewer terminal.

According to an exemplary embodiment, the system further comprises a studio providing a space for installing the broadcast terminal.

According to an exemplary embodiment, the studio comprises a table including a top plate, a bottom plate, and legs supporting the top plate at a certain height from the bottom plate, and providing the space for installing the broadcast terminal on the top plate; a lifter vertically moving up or down the table; and a screen module installed at a distance from the table for providing a background screen of the live broadcast.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
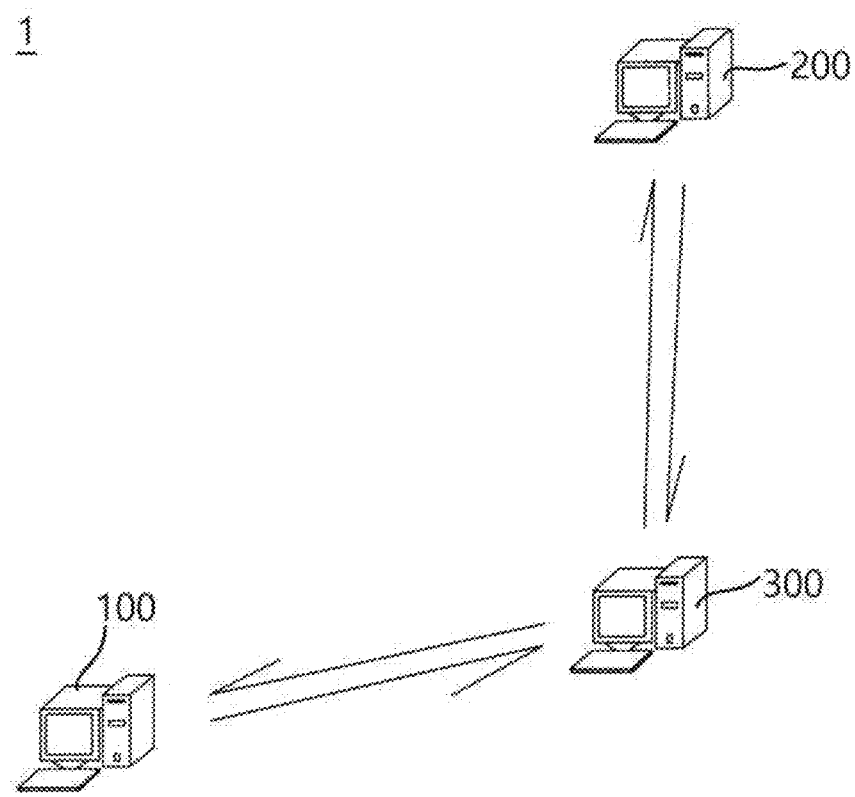
FIG. 1 is a conceptual diagram of a system for providing a live commerce integrated solution, according to an embodiment of the disclosure.

Effects and features of the disclosure, and methods of attaining them will be clearly understood by referring to embodiments as will be described in detail below in connection with accompanying drawings. The disclosure is not, however, limited to the following embodiments and may be implemented in various forms, and the embodiments are provided to make the disclosure complete and make those of ordinary skill in the art fully understand the scope of the disclosure. The disclosure will be defined solely by appended claims. Throughout the specification, like reference numerals refer to like elements.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is a conceptual diagram of a system for providing a live commerce integrated solution, according to an embodiment of the disclosure.

Referring to FIG. 1, a system 1 for providing a live commerce integrated solution according to an embodiment of the disclosure may include a broadcast terminal 100, a buyer terminal (or viewer terminal) 200, and a manager server 300.

The broadcast terminal 100 may be a terminal for filming a live broadcast for product sales, e.g., a terminal used by a seller who hosts the live broadcast such as, for example, an influencer, a show host, etc.

The viewer terminal 200 may be a terminal for streaming the live broadcast, which may be used by a viewer or a buyer.

The manager server 300 may provide an electronic commerce transaction (EC) service that enables product purchase through a live broadcast platform and a live broadcast that may be accessed by the broadcast terminal 100 and the viewer terminal 200. For example, the live broadcast platform may be provided through various broadcast platforms such as a wired or wireless online platform, a communication network platform, an Internet protocol television (IPTV) platform, a cable television (TV) broadcast platform, an airwave TV broadcast platform, and a satellite broadcast platform.

The manager server 300 may provide a live commerce integrated solution service according to an embodiment.

The live commerce integrated solution service may include a live broadcast viewer analysis service, a live broadcast resource matching service, and a live commerce supporting service.

The live broadcast viewer analysis service may include a service for analyzing live broadcast viewer data for each product, a service for analyzing buyer data through a live broadcast for each product, etc.

The live broadcast resource matching service may include a service for estimating a target buyer type for each product and a service for matching live broadcast resources such as a content, a producer, a studio, a show host, broadcasting deliberations, etc., for the target buyer type The live commerce support service may include a quick commerce service for providing a limited supply of a product on sale through a live broadcast by quick delivery, a translation service for automatically translating a language used in the live broadcast, etc.

The manager server 300 may provide a website in a wired or wireless Internet web environment, and the broadcast terminal 100 and the viewer terminal 200 may be registered in the manager server 300 as a seller and a viewer, respectively, by accessing and signing up for the website.

When accessed by the broadcast terminal 100, the manager server 300 may provide a live broadcast channel to the broadcast terminal 100 and allow the broadcast terminal 100 to operate the live broadcast channel.

When accessed by the viewer terminal 200, the manager server 300 may allow the viewer terminal 200 to search for various live broadcast channels and watch a live broadcast through a particular broadcast channel selected by the viewer terminal 200. In this case, the manager server 300 provides the viewer terminal 200 with a function of directly communicating with the seller through text chat or comments in a broadcast watched by the viewer terminal 200.

The manager server 300 provides an EC system for providing information about a price, details, etc., of a product on sale in each broadcast channel operated by the broadcast terminal 100 and supporting a payment procedure to make payments.

Figure 2:
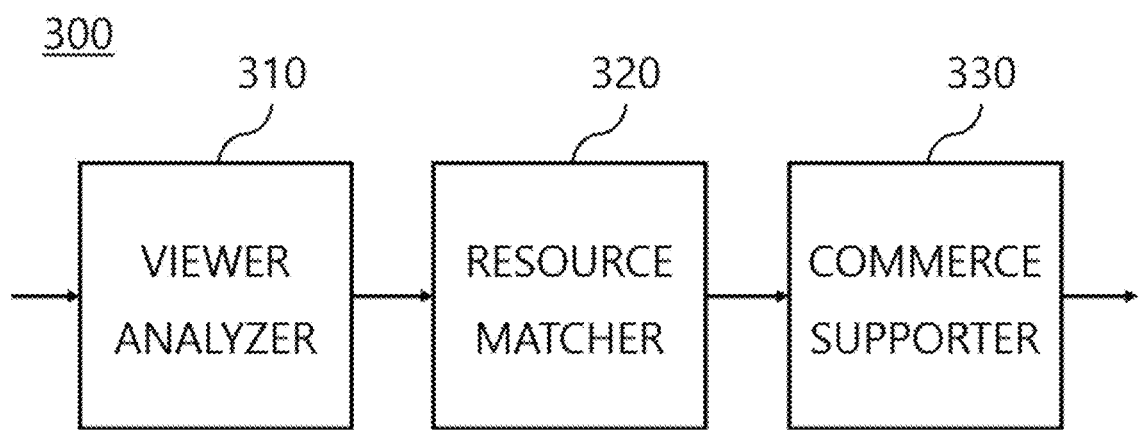
FIG. 2 is a control block diagram of a manager server shown in FIG. 1.

FIG. 2 is a control block diagram of the manager server shown in FIG. 1.

Referring to FIG. 2, the manager server 300 may include a viewer analyzer 310, a resource matcher 320 and a commerce supporter 330.

The viewer analyzer 310 may perform a live broadcast viewer analysis service.

For example, the viewer analyzer 310 may collect live broadcast viewer information through the viewer terminal 200 and build a database, and produce live broadcast viewer analyzed data for each product by analyzing the database.

The resource matcher 320 may perform a live broadcast resource matching service.

For example, the resource matcher 320 may use the live broadcast viewer analyzed data for each product to specify a target viewer group of the product to be on sale, and generate live broadcast configuration information matched with a live broadcast resource tailored to the product and target viewer group and provide the live broadcast configuration information to the broadcast terminal 100.

The commerce supporter 330 may perform a live commerce support service.

For example, the commerce supporter 330 may obtain payment information through a live broadcast to extract quick delivery targeted payment information, and transmit the quick delivery targeted payment information to a product provider terminal so that the product provider performs quick delivery. Furthermore, the commerce supporter 330 may automatically translate a language used in the live broadcast according to a setting of the viewer terminal 200 and provide a result of the translation.

Figure 3:
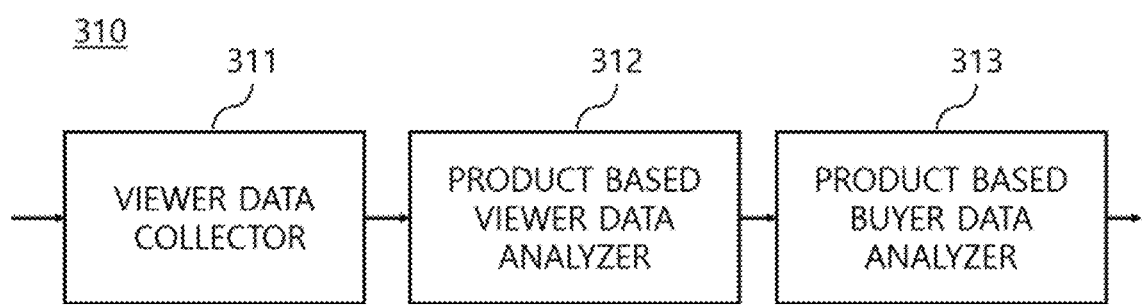
FIG. 3 is a control block diagram of a viewer analyzer shown in FIG. 2.

FIG. 3 is a control block diagram of the viewer analyzer shown in FIG. 2.

Referring to FIG. 3, the viewer analyzer 310 may include a viewer data collector 311, a product based viewer data analyzer 312, and a product based buyer data analyzer 313.

The viewer data collector 311 may request and receive a category of the product on sale in the current live broadcast from the broadcast terminal 100. For example, the category may be divided into food, clothing, sundries, home appliances, luxury goods, etc.

The viewer data collector 311 may request and receive information about a viewer who watches the live broadcast from the broadcast terminal 200. The viewer information may include age, gender, residence, etc.

The viewer data collector 311 may build a viewer information database that stores viewer information matched with each product category.

The product based viewer data analyzer 312 may analyze the viewer information database to estimate a target viewer type by combining respective elements of the viewer information for each product category, and store the target viewer type matched for each product category For example, the product based viewer data analyzer 312 may estimate a target viewer type by combining respective elements of the viewer information involved with the highest viewer ratings for each product category.

The product based buyer data analyzer 313 may request and receive information about a buyer who purchased the product among the viewers watching the live broadcast from the viewer terminal 200. The buyer information may include viewer information including age, gender, residence, etc., a product price, a payment method, etc.

The product based buyer data analyzer 313 may build a buyer information database storing buyer information matched with each product category.

The product based buyer data analyzer 313 may analyze the buyer information database to estimate a target buyer type by combining respective elements of the buyer information for each product category, and store the target buyer type matched for each product category.

For example, the product based buyer data analyzer 313 may estimate a target buyer type by combining respective elements of the buyer information involved with the highest purchase rate for each product category.

Figure 4:
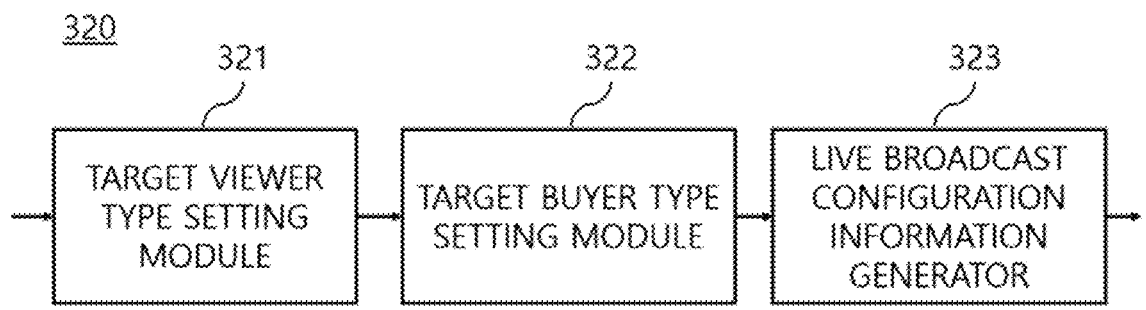
FIG. 4 is a control block diagram of a resource matcher shown in FIG. 2.

FIG. 4 is a control block diagram of the resource matcher shown in FIG. 2.

Referring to FIG. 4, the resource matcher 320 may include a target viewer type setting module 321, a target buyer type setting module 322, and a live broadcast configuration information generator 323.

The target viewer type setting module 321 may request and receive a category of a product to be aired on a live broadcast from the broadcast terminal 100 or a seller terminal in charge of selling the product.

The target viewer type setting module 321 may set a target viewer type matched with a category of the product and stored in the product based viewer data analyzer 312 to a target viewer type of the product to be on sale.

The target buyer type setting module 322 may set a target buyer type matched with a category of the product and stored in the product based buyer data analyzer 313 to a target buyer type of the product to be on sale.

The live broadcast configuration generator 323 may match and provide a live broadcast resource for the product category, the target viewer type and the target buyer type to the seller terminal or the broadcast terminal 100 in charge of selling the product.

For example, the live broadcast configuration information generator 323 may include a live broadcast resource database that stores each element of the live broadcast resource matched with the product category, the target viewer type and the target buyer type. For example, for one of the live broadcast resources, e.g., a show host, a product category preferred by the show host, a target viewer type involved with high viewer ratings in a live broadcast history and a target buyer type involved with a high purchase rate in the live broadcast history may be matched and stored.

The live broadcast configuration information generator 323 may search the live broadcast resource database for a product category, a target viewer type and a target buyer type to extract respective elements of the live broadcast resource, generate live broadcast configuration information by combining the respective elements of the live broadcast resource and provide the live broadcast configuration information to the seller terminal or the broadcast terminal 100.

Figure 5:
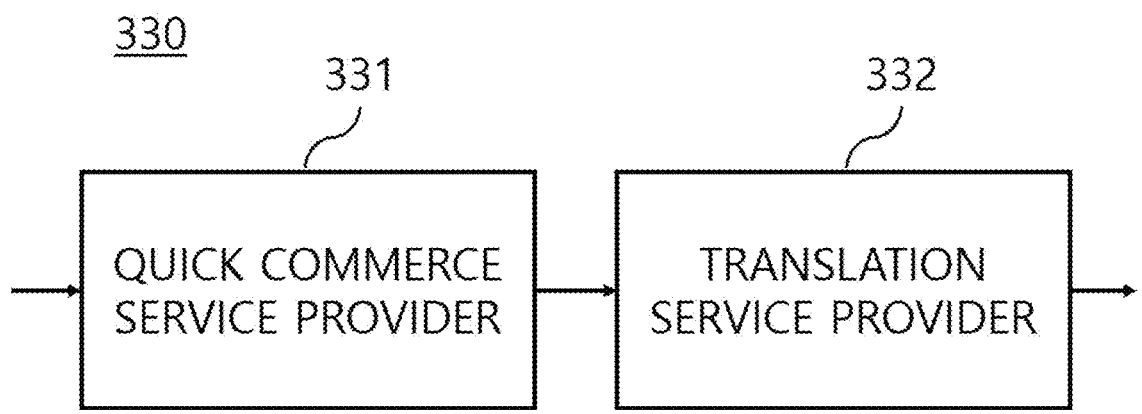
FIG. 5 is a control block diagram of a commerce supporter shown in FIG. 2.

FIG. 5 is a control block diagram of the commerce supporter shown in FIG. 2.

Referring to FIG. 5, the commerce supporter 330 may include a quick commerce service provider 331 and a translation service provider 332.

The quick commerce service provider 331 may obtain payment information through a live broadcast and extract payment information targeted at quick delivery. The payment information may include a buyer's name, contact, address, etc.

For example, the quick commerce service provider 331 may extract payment information for an initial limited supply (e.g., 200) of the product on sale through the live broadcast as quick delivery targeted payment information.

The quick commerce service provider 331 may transmit the quick delivery targeted payment information to the seller terminal so that quick delivery may be made.

The translation service provider 332 may automatically translate a language used in the live broadcast according to a setting of the viewer terminal 200 through an artificial intelligence (AI) translation function and send out the result.

A live commerce integrated solution system according to another embodiment of the disclosure may include a studio 500 in addition to the configuration of the broadcast terminal 100, the viewer terminal 200 and the manager server 300 as shown in FIG. 1.

The broadcast terminal 100 may be installed in the studio 500, and the studio 500 may provide a live broadcast filming space.

Figure 6:
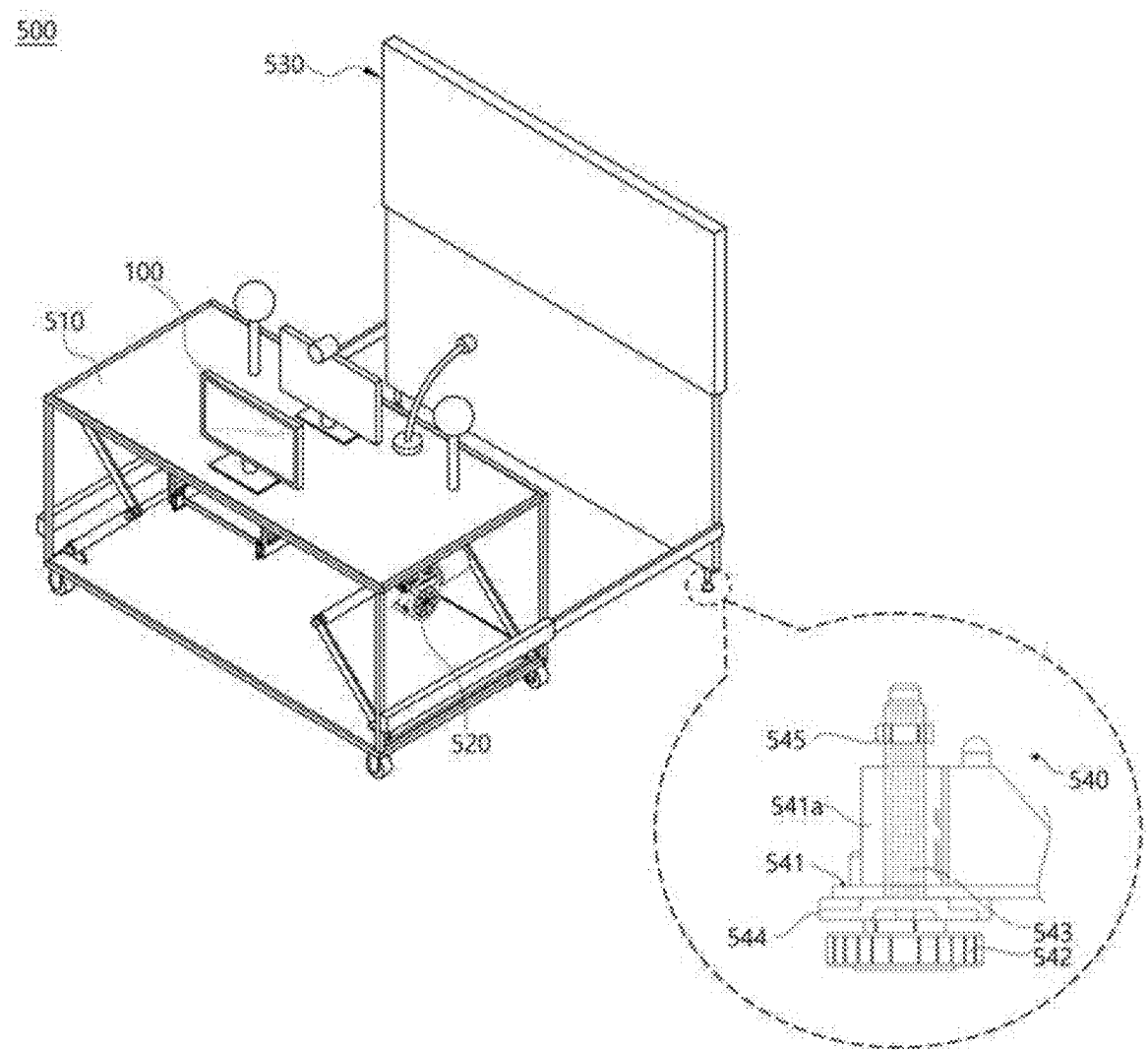
FIG. 6 illustrates an example of a studio, according to an embodiment of the disclosure.

FIG. 6 illustrates an example of a studio, according to an embodiment of the disclosure.

Referring to FIG. 6, the studio 500 according to an embodiment of the disclosure may include a table 510, a lifter 520, and a screen module 530.

The table 510 may include a top plate, a bottom plate, and legs for supporting the top plate at a certain height from the bottom plate, and provide a space for installing the broadcast terminal 100.

The lifter 520 may vertically move up or down the table 510.

For example, the lifter 520 may include a supporter installed in the shape of 'X' between the top plate and the bottom plate, and a driving motor operated to fold or unfold the supporter. The driving motor may be arranged to turn a screw at an intersection of the supporter and operated to fold or unfold the supporter. The top plate may be moved up to unfold the supporter, and the top plate may be moved down to fold the supporter.

The screen module 530 may be installed at a distance from the table 510, and a show host may stand in a space formed between the screen module 530 and the table 510 to host a live show against a backdrop of the screen module 530.

The screen module 530 may be installed on the ground through an installation module 540.

The installation module 540 may include an installation block 541, a plurality of installation rods fastened to the installation block 541 to be height adjustable, and fixing members equipped on the installation rods to prevent the installation rods from being unfastened from the installation block 541.

The installation block 541 may be equipped on edges of the bottom surface of the screen 350, and may form an installation hole 541a for the installation rod to pass through.

In this case, female screw threads may be formed on the inner circumferential surface of the installation hole 541a to be fastened with the installation rod.

The installation rod is fastened with the installation hole 541a of the installation block 541 to support the weight of the screen 530 and simultaneously, install the screen module 530 to be leveled.

The installation rod may include a body 542 with male screw threads formed on the outer circumferential surface, and a supporter 543 formed on the body 542 to buffer and absorb vibration of the screen module 530.

The body 542 is a fastening member shaped like a cylinder fastened with and passing through the installation hole 541a, which may have male screw threads formed on the outer circumferential surface to be fastened with the female screw threads of the installation hole 541a and may be formed to be longer in the vertical direction than the installation hole 541a so that the height of the screen module 530 from the ground is adjustable.

The body 542 may include a fastening nut 544 closely contacting the bottom surface of the installation block 541 after completion of the height adjustment. Specifically, the fastening nut 544 is fastened with the body 542 to be placed between the installation block 541 and the supporter 543, and closely contacts the bottom surface of the installation block 541 to prevent arbitrary rotation of the body 542.

The supporter 543 is a member for supporting the weight of the screen module 530 seated on the ground, so the supporter 543 is formed of a buffering material to absorb vibration applied from the ground to the screen module 530.

A fastening member may be a fastening nut 545 fastened and fixed to an upper portion of the body 542 passing through the installation hole 541a, to be caught on the upper portion of the installation hole 541a when the body 542 is overly unfastened.

In other words, the fastening nut 545 prevents the body 542 from being unfastened any further by being caught on the upper portion of the installation hole 541a when the body 542 is unfastened farther than a maximum height within which the screen module 530 is stably supported.

Accordingly, the installation module 540 may help the screen module 530 installed to level off and absorb vibration to prevent various safety accidents.

According to the disclosure, products sales may be enabled through two way communication between a seller and a buyer, and micro businesses or small businesses in particular may easily access live commerce and expect market extension and sale increase.

The embodiments of the disclosure have thus far been described with reference to accompanying drawings. It will be obvious to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. A system for providing a live commerce integrated solution comprising:
a manager server configured to provide a live broadcast platform to be accessed by a broadcast terminal which films a live broadcast for product sales and a viewer terminal which streams the live broadcast,
wherein the manager server comprises:
a viewer analyzer configured to collect and analyze live broadcast viewer information;
a resource matcher configured to generate live broadcast configuration information matched with live broadcast resources including a content for each product, a producer, a studio, a show host, and broadcast deliberations; and
a commerce supporter configured to support an additional service for product sales through the live broadcast,
wherein the viewer analyzer comprises:
a viewer data collector configured to request and receive a category of a product on sale in a current live broadcast from the broadcast terminal, request and receive information about a viewer watching the live broadcast from the viewer terminal, and build a viewer information database storing viewer information matched for each product category;

a product based viewer data analyzer configured to use the viewer information database to estimate a target viewer type by combining respective elements of the viewer information based on a certain criterion for each product category and store the target viewer type matched for each product category; and a product based buyer data analyzer configured to request and receive information about a buyer who purchased the product among viewers watching the live broadcast from the viewer terminal, build a buyer information database storing buyer information matched for each product category, use the buyer information database to estimate a target buyer type by combining respective elements of the buyer information according to a certain criterion for each product category, and store the target buyer type matched for each product category, wherein the resource matcher comprises:

a target viewer type setting module configured to request and receive a category of a product to be aired on a live broadcast from the broadcast terminal or a seller terminal owned by a seller who sells the product, and set a target viewer type matched and stored with the received category of the product to a target viewer type of the product to be on sale;

a target buyer type setting module configured to set a target buyer type matched and stored with the received category of the product to a target buyer type of the product to be on sale; and a live broadcast configuration information generator configured to include a live broadcast resource database storing a product category, a target viewer type and a target buyer type matched with respective elements of a live broadcast resource according to a certain criterion, search the live broadcast resource database for a category of a product to be on sale, a target viewer type of the product to be on sale, and a target buyer type of the product to be on sale to extract each element of the live broadcast resource, generate live broadcast configuration information by combining the extracted live broadcast resources according to a certain criterion, and transmit the live broadcast configuration information to the broadcast terminal or the seller terminal, and wherein the live broadcast resource database stores information on the show host including a product category preferred by the show host, a target viewer type for the show host based on viewer ratings in a live broadcast history of the show host, and a target buyer type for the show host based on a purchase rate in the live broadcast history of the show host.

2. The system for providing a live commerce integrated solution of claim 1, further comprising:

a table including a top plate, a bottom plate, and legs supporting the top plate at a certain height from the bottom plate, and providing the space for installing the broadcast terminal on the top plate;

a lifter vertically moving up or down the table; and a screen module installed at a distance from the table for providing a background screen of the live broadcast.

* * * * *